No. 624,461. Patented May 9, 1899.
F. A. CROCKER.
COW TAIL HOLDER.
(Application filed Jan. 5, 1899.)
(No Model.)

WITNESSES
Chas. J. Haynes
James P. Forrest

INVENTOR
Fred A. Crocker
By his attorney
Harry O. Robinson

UNITED STATES PATENT OFFICE.

FRED A. CROCKER, OF LINCOLN, MAINE.

COW-TAIL HOLDER.

SPECIFICATION forming part of Letters Patent No. 624,461, dated May 9, 1899.

Application filed January 5, 1899. Serial No. 701,187. (No model.)

*To all whom it may concern:*

Be it known that I, FRED A. CROCKER, a citizen of the United States of America, and a resident of Lincoln, county of Penobscot, State of Maine, have invented certain new and useful Improvements in Cow-Tail Holders, of which the following is a specification.

This invention has for its object to provide a simple and convenient device for holding a cow's tail, adapted to be used while the animal is being milked, to prevent the tail from being switched into the face of the milker.

The device consists of a rod of spring-wire bent double a portion of its length to form a shank, one portion of said wire continuing singly beyond said shank to form a hook and the other portion bent so as to form a spring-coil and continuing from said coil substantially parallel to said shank to form a lever arranged to pass up between the two members of said shank and bent forward in the direction of said shank to form a spring-acting clamping-arm normally pressing against said shank.

Figure 1:
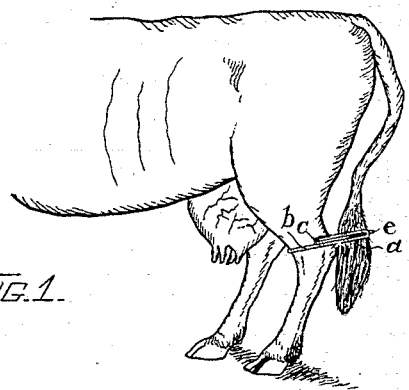
Figure 2:
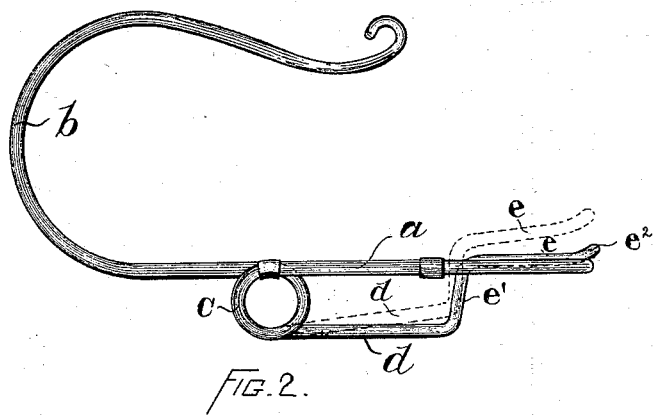

Figure 1 is a side view of a part of a cow, showing the cow-tail holder applied to the tail of the animal. Fig. 2 is a side elevation of the cow-tail holder, and Fig. 3 is a plan view of the parts shown in Fig. 2.

Figure 3:
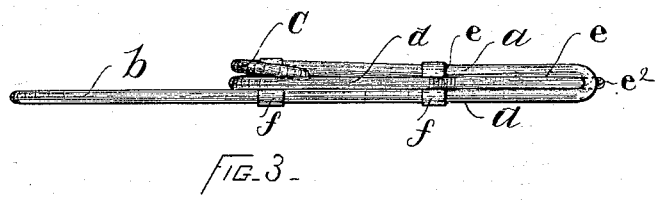

The cow-tail holder is formed of a rod of spring-wire bent double for a proper length to form a shank $a$, as shown in Figs. 2 and 3. One portion of said rod is continued beyond said shank $a$ to form a hook $b$, adapted to pass around one of the cow's hind legs, preferably just above the gambrel-joint, and the other portion of said wire is bent into a coil $c$, which acts as a spring, to be referred to. Said wire leaves said coil $c$ from the opposite side from which it begins to bend to form said coil $c$ and at a distance from said shank $a$ substantially the width of said coil $c$, forming a lever $d$, which is arranged substantially parallel to said shank $a$. Said lever $d$ turns nearly at right angles, as at $e'$, passing up between the two wires of said shank $a$, and, turning, is bent forwardly to form a clamping-arm $e$. The coil $c$ acts as a spring, normally pressing said clamping-arm $e$ between and against the two members of said shank $a$, and the end $e^2$ of said clamping-arm projects slightly beyond said shank $a$ to prevent any tendency of said clamping-arm $e$ to slip between said members of said shank $a$.

To apply said cow-tail holder, the hook $b$ is adjusted around the animal's hind leg, preferably just above the gambrel-joint, the lever $d$ is depressed against the action of said coil-spring $c$ into the dotted-line position shown in Fig. 2, the long hairs of the tail are slipped between said clamping-arm $e$ and said shank $a$, and pressure being removed from said lever $d$ the tail is securely attached to the animal's leg, as shown in Fig. 1 of the drawings.

I claim—

A cow-tail holder consisting of a rod of spring-wire bent double a portion of its length to form a shank $a$, one wire continuing singly to form a hook $b$ and the other wire bent so as to form a spring-coil $c$, and continuing substantially parallel to said shank $a$ to form a lever $d$, arranged to pass up between the two members of said shank $a$ and bent forward in the direction of said shank $a$ to form a spring-acting clamping-arm $e$, normally held against said shank $a$ by said coil-spring $c$, substantially as described.

Signed by me, at Lincoln, Maine, this 2d day of January, 1899.

FRED A. CROCKER.

Witnesses:
   FRED H. ADAMS,
   WALTER CLARK.